(12) United States Patent
Gilbertson

(10) Patent No.: US 12,400,185 B1
(45) Date of Patent: *Aug. 26, 2025

(54) SYSTEMS AND METHODS FOR SUPPLY CHAIN MANAGEMENT

(71) Applicant: SIRVA WORLDWIDE, INC., Oakbrook Terrace, MN (US)

(72) Inventor: Jon J. Gilbertson, Chaska, MN (US)

(73) Assignee: SIRVA WORLDWIDE, INC., Oakbrook Terrace, IL (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/844,821

(22) Filed: Jun. 21, 2022

Related U.S. Application Data

(63) Continuation of application No. 16/778,309, filed on Jan. 31, 2020, now Pat. No. 11,397,918.

(60) Provisional application No. 62/800,663, filed on Feb. 4, 2019.

(51) Int. Cl.
| | |
|---|---|
| *G06Q 10/0875* | (2023.01) |
| *G06K 7/14* | (2006.01) |
| *G06Q 10/0833* | (2023.01) |
| *G06Q 30/04* | (2012.01) |
| *G06Q 40/12* | (2023.01) |

(52) U.S. Cl.
CPC ....... *G06Q 10/0875* (2013.01); *G06K 7/1413* (2013.01); *G06Q 10/0833* (2013.01); *G06Q 40/123* (2013.12); *G06Q 30/04* (2013.01)

(58) Field of Classification Search
CPC .......... G06Q 10/0875; G06Q 10/0833; G06Q 40/123; G06Q 30/04; G06Q 10/087; G06K 7/1413
USPC .......................................... 705/29
See application file for complete search history.

(56) References Cited

U.S. PATENT DOCUMENTS

| | | | |
|---|---|---|---|
| 9,792,597 B1 | 10/2017 | Jen | |
| 2003/0148775 A1* | 8/2003 | Spriestersbach | H04L 67/04 455/456.1 |
| 2007/0198432 A1* | 8/2007 | Pitroda | G06Q 20/327 705/64 |
| 2012/0084119 A1 | 4/2012 | Vandehey | |
| 2012/0303498 A1* | 11/2012 | Cova | G06Q 10/08 340/572.1 |
| 2016/0042312 A1 | 2/2016 | Siebrecht | |
| 2018/0225775 A1 | 8/2018 | Pan | |

* cited by examiner

*Primary Examiner* — Michael Jared Walker
*Assistant Examiner* — Denisse Y Ortiz Roman
(74) *Attorney, Agent, or Firm* — UB Greensfelder LLP; Brian E. Turung

(57) ABSTRACT

Systems and methods are disclosed that provide a holistic view across a logistics ecosystem that conventionally would include processes involving discrete steps that are handled or managed by a Transportation Management System, a Warehouse Management System, an Order Management System, among others. Tasks and processes can be performed within a single platform and are applied based on the nature and status of the product/part, orders, and other data, demographics, and desires associated with them.

21 Claims, 6 Drawing Sheets

FIG. 5

SUPPLY CHAIN MANAGEMENT COMPUTING SYSTEM — 300

330

ORDER DETAIL: 222
LOCATION: R395 CAP 3000
ORIGIN: HASSENKAMP, FRANKFURT GERMANY
DESTINATION: TEAM RELOCATION, NICE ITALY
SHIPPING METHOD: LESS THAN TRUCKLOAD (LTL)

PALLET DETAILS
READABLE TAG: PA-000000557-00001
SIZE & WEIGHT: 220 x 100 x 98 cm / 90 kg
DIMENSIONAL WEIGHT: 431.20

338

| ORDER REC'D | PICK-ING | PICKUP REQ. | IN TRANSIT | DEST. WHSE | FINAL DELIVERY |
|---|---|---|---|---|---|
| 1.15.19 | 1.15.19 | 1.16.19 | 1.19.19 | 1.20.19 | 1.22.19 |

332

334

ORDER OVERVIEW

| PART # | ITEM NAME | MANUF. | QTY. ORDERED | UNITS ORDERED | SCANNED |
|---|---|---|---|---|---|
| 930HP118 | MAPLE STOOL | CAPESON | 2 BOXES | 2 UNITS | COMPLETE |
| 925052 | SHELF DOUBLE STANDARD | F&S INC | 2 BOXES | 2 UNITS | COMPLETE |
| 1123455 | TRAY-BACKER | B&B LLC | 3 BOXES | 72 UNITS | COMPLETE |
| 112288x3 | IPAD SPINE-SMALL | B&B LLC | 1 BOX | 5 UNITS | COMPLETE |

SCANNED ITEMS

| READABLE TAG | PART NO. | ITEM NAME | WAREHOUSE |
|---|---|---|---|
| SP-000000093-00010 | 1123455 | TRAY-BACKER | HASSENKAMP, FRANKFURT GERMANY |
| SP-000000093-00232 | 1123455 | TRAY-BACKER | HASSENKAMP, FRANKFURT GERMANY |
| SP-000000093-00089 | 1123455 | TRAY-BACKER | HASSENKAMP, FRANKFURT GERMANY |
| SP-000000006-02532 | 930HP118 | MAPLE STOOL | HASSENKAMP, FRANKFURT GERMANY |
| SP-000000006-00119 | 930HP118 | MAPLE STOOL | HASSENKAMP, FRANKFURT GERMANY |
| SP-000000034-00002 | 925052 | SHELF DOUBLE STANDARD | HASSENKAMP, FRANKFURT GERMANY |
| SP-000000034-02001 | 925052 | SHELF DOUBLE STANDARD | HASSENKAMP, FRANKFURT GERMANY |
| SP-000000201-00711 | 112288x3 | IPAD SPINE-SMALL | HASSENKAMP, FRANKFURT GERMANY |

336

SYSTEMS AND METHODS FOR SUPPLY CHAIN MANAGEMENT

CROSS-REFERENCE TO RELATED APPLICATIONS

This application is a continuation of U.S. patent application Ser. No. 16/778,309, filed on Jan. 31, 2020, which claims the benefit of U.S. provisional patent application Ser. No. 62/800,663, filed on Feb. 4, 2019, entitled SYSTEMS AND METHODS FOR SUPPLY CHAIN MANAGEMENT, the disclosures of which is incorporated herein by reference in their entirety.

BACKGROUND

A Transportation Management System (TMS) typically sits between an Order Management System (OMS or ERP) and a Warehouse Management System (WMS), which includes an Inventory Management System as a sub-component. Supply Chain Management Systems (SCM) and Customer Relationship Management Systems (CRMS) are additional systems that are sometimes utilized to help manage an overall order fulfillment process.

Conventionally, an ERP (or OMS) application passes inbound and/or outbound orders to the TMS application to determine the optimized transportation routing to deliver items to a destination. This logistical process is complicated when the products or parts that are ordered are in various warehouses, and multiple companies may be involved to ensure the products or parts are delivered to the final destination. Depending on the complexity of the supply chain, some products or parts associated with an order may be at the location of another end user, as may be the case for certain products or parts that are subject to a rental or consignment agreement, for example. Further, as multiple systems and companies are involved in the conventional process, there is typically redundancy within each system that results in inefficiency.

BRIEF DESCRIPTION OF THE DRAWINGS

It is believed that certain embodiments will be better understood from the following description taken in conjunction with the accompanying drawings, in which like references indicate similar elements and in which:

FIG. 5 schematically illustrates an example order detail that can be generated by the supply chain management computing system in accordance with one non-limiting embodiment.

DETAILED DESCRIPTION

Figure 1:
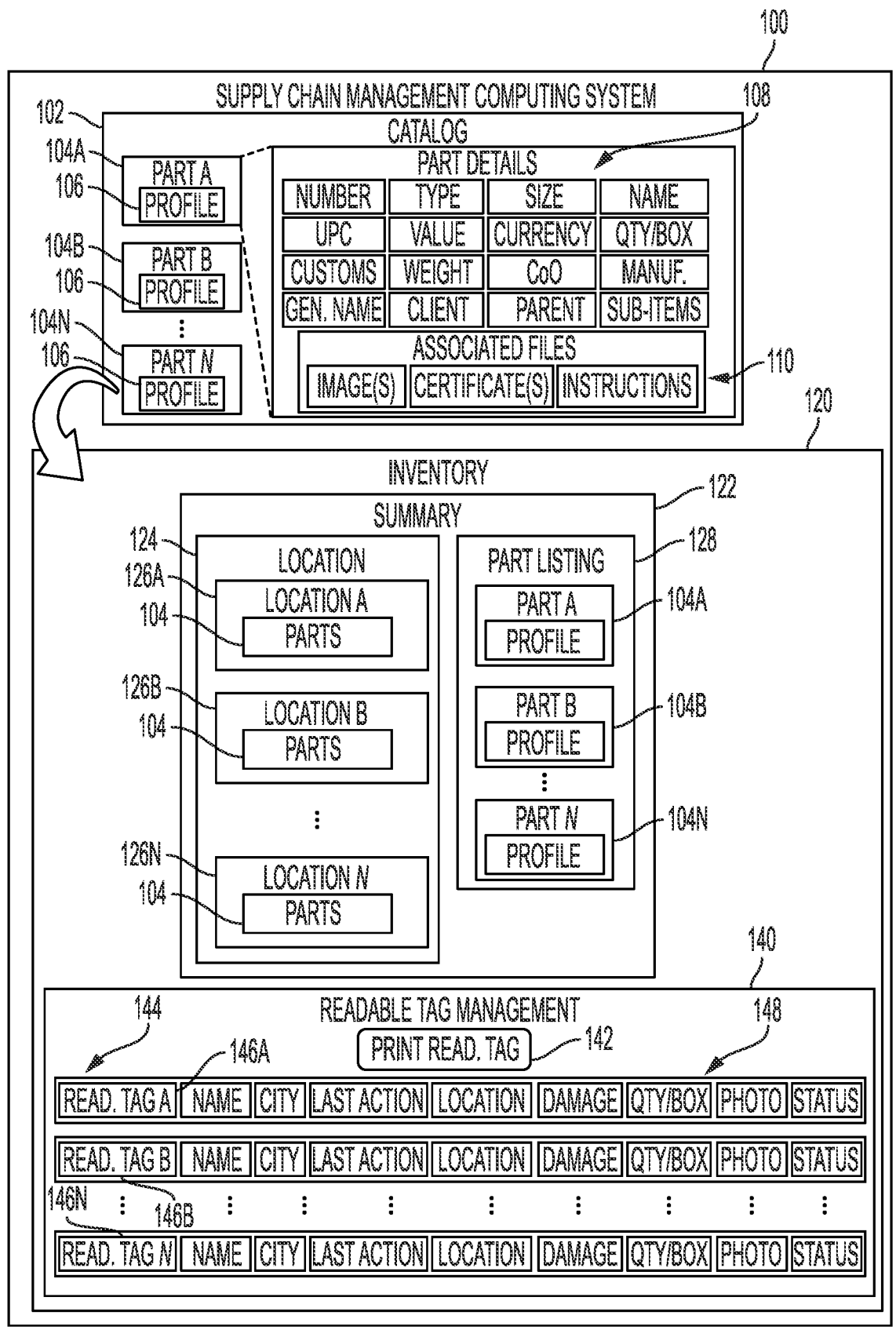
FIG. 1 schematically depicts portions an example supply chain management system relating to a parts catalog and inventory management in accordance with one non-limiting embodiment.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-6 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, then are described.

Attempts have been made to integrate existing TMS and WMS systems. Integration of these disparate systems can be done in an effort to strengthen end-to-end visibility across warehouse and shipping functions. The desired result of the integration is often to provide the customer with a more holistic view of operations to lead to better coordination and planning among all companies involved. Companies that provide approaches to integrating the various systems are typically from the point of view of either the warehouse team or the logistics end, with one system essentially just pulling in information from the other. As a result, their efforts have lacked an approach that balances optimization with a shared set of goals. Moreover, each of these legacy processes that are being integrated typically have been established over several years, which makes integration between these two systems and processes difficult. Further, conventional systems operate as individual silos, typically with oversight from separate teams, departments, or organizations, which further reduces the effectiveness of convention integration methods.

The systems and methods described herein do not necessarily rely on connections to other disparate TMS or WMS systems, and as such, do not depend on handing off to another system to complete tasks. Instead, tasks and processes can be performed within one system and are applied based on the nature and status of the product/part, orders, and other data, demographics and desires associated with them. In other words, the systems and methods described herein can beneficially provide a single platform to provide a holistic view across an ecosystem that conventionally would include processes involving discrete steps that are handled or managed by a TMS, a WMS, an ERP, and so forth.

In accordance with the present disclosure, instead of utilizing conventional pillared siloes to support the process, the system and methods described herein can provide for the tracking of each part or product from the manufacturer through the life of each product. In some implementations, such parts or products can be processed in a number of ways, such as being stored or held temporarily at various locations, combined with other parts that are sent to a customer, further developed, etc. Moreover, in some embodiments, the systems and methods described herein include tracking and managing a product or part after final delivery to the customer. For instance, such implementation can be implicated to manage the disposing of items after a customer (or company) is finished with the part(s) as to achieve various goals related to reusability or sustainability. Thus, in accordance with the presently disclosed systems and methods, companies can easily receive improved visibility into parts and orders within their supply chain and be provided with centralized visibility across multiple international locations. Moreover, as described in more detail below, the systems and methods can allow for and automate international e-commerce transactions.

Referring now to FIG. 1, portions of an example supply chain management system 100 relating to a parts catalog and inventory management in accordance with one non-limiting embodiment is schematically depicted. The supply chain management computing system 100 can store profiles 106 for each of a plurality of parts 104A-N managed by the system in a catalog 102. As is to be appreciated, the catalog 102 may store information regarding thousands or even millions of parts. Further, while FIG. 1 depicts individual parts 104A-N for the purposes of illustration, it is to be readily understood that the supply chain management computing system 100 can store profiles 106 for and track, manage, and process a variety of components, products, items, devices, structures, assemblies, and so forth, which are generally referred to herein as parts for ease of explanation. The supply chain management computing system 100 can store informational details for each part 104A-N in the respective profile 106. The profile 106 can vary in format, but in some embodiments, the profile includes data fields that are populated with information that can be utilized at various points along the supply chain process.

The supply chain management computing system 100 can utilize the information in data fields 108 of the profile 106 and the relationships with other parts to provide process automation and automated process controls for warehouse and transportation processes. Such information can be used to auto-populate documents, auto generate emails or other communications, such as text messages, instant messages, push notifications, automated telephone calls, and so forth. For example, an example profile 106 can include data fields including, but not limited to, part number, category, type, size, name, quantity per box, manufacturer, UPC, customs information, value in a particular currency, weight, certificate of origin information, general name, and/or client information. Additionally, the profile 106 can assist the supply chain management computing system 100 in understanding the relationships (i.e., parent/child) between various parts 104A-N, which can provide for enhanced automation among other functionalities.

In accordance with some embodiments, the part profile 106 can include associated files 110 that are stored by the supply chain management computing system 100. While the types of associated files 110 may vary, in some embodiments, the associated files 110 can include an image of the item that can be used by a delivery person, installer, and so forth. In some embodiments, the associated files 110 can include one or more certificates. Such certificates can be used for customs documentation, such as a Deep Processing statement from the manufacturer, as may be required to ship certain parts to certain destinations. In some embodiments, the associated files 110 can include one or more instructions, such as assembly documents. Thus, if an installer receives one of the parts 104A-N, but it needs to be assembled prior to use, the assembly document can be made available by the supply chain management computing system 100, as needed.

In addition to the part catalog 102, the supply chain management computing system 100 can also provide substantially real-time location management for an inventory 120. Thus, for each of the parts 104A-N the supply chain management computing system 100 can provide tracking of real-time location thereby giving deep visibility to a user. For illustration purposes, FIG. 1 depicts an example inventory summary 122 managed by the supply chain management computing system 100 that can provide information based on a location listing 124 or based on a part listing 128. For example, the supply chain management computing system 100 can provide a list of parts 104 that are at each location A-N. The supply chain management computing system 100 can identify, for example, the quantity of the parts received, the quantity of those parts that are subject to an order, and an on-hand quantity. Locations A-N can include, for example, warehouses, shipping facilities, stockrooms, stores, production facilities, and so forth. Moreover, the locations A-N can also include specific locations within another location, such as a room number, a rack number, a shelf number, a floor number, a shipping bay, a loading dock, and so forth. The inventory summary 122 can also provide location information based on parts 104A-N thereby allowing a user to gain insight into present locations of each of the parts 104A-N.

The supply chain management computing system 100 can further utilize readable tags to manage process flows. In this regard, the supply chain management computing system 100 can have an interface for readable tag management 140. Through the readable tag management 140, a user can print or otherwise produce a readable tag 142 that can be affixed to a part, pallet, or other item under the management of the supply chain management computing system 100. In accordance with the present embodiment, any suitable type of readable tags can be used, such as barcodes, quick response codes, among other tags that can optically scanned. Additionally or alternatively, other types of readable tags utilizing near field communication protocols can be utilized. In any event, each readable tag 146A-N generated by the supply chain management computing system 100 can be associated with various profile information 148. Example profile information 148 is shown in FIG. 1 to include name, city, last action information, location information, damage information, quantity per box, photograph, and status. Thus each part, pallet, or other item can be provided with a unique barcode or other type of readable tag that can be read by various entities along the supply chain.

Figure 2:
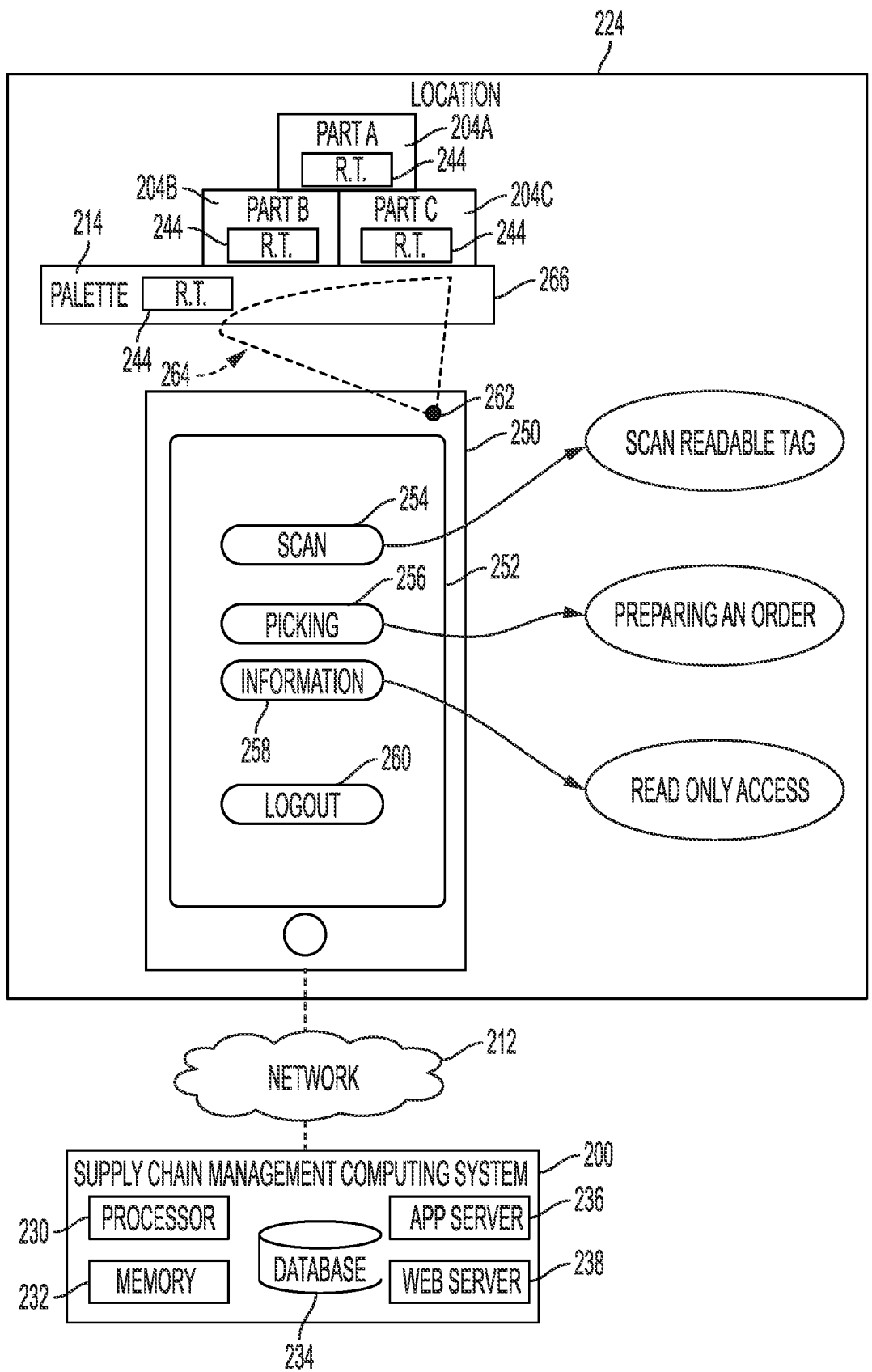
FIG. 2 schematically depicts a mobile application that can be executed on a mobile communications device and allow interaction with a supply chain management computing system.

FIG. 2 schematically depicts a mobile application that can be executed on a mobile communications device 250 and allow interaction with a supply chain management computing system 200. The mobile communications device 250 can be any suitable device having a suitable connection to a network 212, such as a mobile phone, a laptop computer, a tablet computer, a wearable device, a handheld scanner, a kiosk, and the like. Generally the mobile communications device 250 can be operated by a user, and in some cases the user owns the device, sometimes referred to as a 'bring your own device' (BYOD) implementation. Thus, a specialized hardware device is not necessarily needed by personnel who are required to interact with the supply chain management computing system 200.

The mobile communications device 250 can have an interface 252 that provides a user of the device with various options, such as a scanning option 254, a picking option 256, an information option 258, and a logout option 260. Each one of the options can be utilized by a user to interact with the supply chain management computing system 200 in different ways. For example, electing the scanning option 254 will allow the user to access a scanner 262 of the device to scan a readable tag. The scanner 262 can be any suitable type of scanner, such as a camera, a LED/laser light, or the like. Selecting the picking option 256 can bring up a parts list for a user to collect from various warehouse locations, for example. As each item is picked, the user can scan a readable tag of the part. FIG. 2 schematically shows parts 204A-C that have been placed on palette 214. Each part 204A-C has a respective readable tag 244 that has been scanned 264 by the mobile communications device 250. As shown, the readable tag 244 has been affixed to the palette 214. The readable tag 244 of the palette 214 can identify what parts are on the palette 214, as well as other shipping related details, such as shipping destination.

FIG. 2 schematically depicts the mobile communications device 250 interacting with the supply chain management computing system 200 via the network 212. The supply chain management computing system 200 can be provided using any suitable processor-based device or system, such as a personal computer, laptop, server, mainframe, mobile computer, other processor-based device, or a collection (e.g. network) of multiple computers, for example. The supply chain management computing system 200 can include one or more processors and one or more memory units. For convenience, only one processor 230 and only one memory unit 232 are shown in FIG. 2. The processor 230 can execute software instructions stored on the memory unit 232. The processor 230 can be implemented as an integrated circuit (IC) having one or multiple cores. The memory unit 232 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 232 can store executable software and data. When the processor 230 of the supply chain management computing system 200 executes the software instructions of various modules, the processor 230 can be caused to perform the various operations of the supply chain management computing system 200. The supply chain management computing system 200 can store and access data in a variety of databases 234. The data stored in the databases 234 can be stored in a non-volatile computer memory, such as a hard disk drive, read only memory (e.g. a ROM IC), or other types of non-volatile memory. In some embodiments, one or more databases of the databases 234 can be stored on a remote electronic computer system and can be accessed by the supply chain management computing system 200 via a network. As one having ordinary skill in the art would appreciate, a variety of other databases or other types of memory storage structures can be utilized or otherwise associated with the supply chain management computing system 200.

Also shown in FIG. 2, the supply chain management computing system 200 can include one or more computer servers, which can include one or more web servers, one or more application servers, and/or other types of servers. For convenience, only one web server 238 and one application server 236 are depicted in FIG. 2, although one having ordinary skill in the art would appreciate that the disclosure is not so limited. The servers 236, 238 can cause content to be sent to the mobile communication device 250 and/or other computing devices, via a network in any of a number of formats. The servers 236, 238 can be comprised of processors (e.g. CPUs), memory units (e.g. RAM, ROM), non-volatile storage systems (e.g. hard disk drive systems), and other elements. The servers 236, 238 may utilize one or more operating systems including, but not limited to, Solaris, Linux, Windows Server, or other server operating systems.

In some embodiments, the web server 238 can provide a graphical web user interface through which various users can interact with the supply chain management computing system 200. The graphical web user interface can also be referred to as a graphical user interface, user portal, user interface, graphical client interface, and so forth. The web server 238 can accept requests, such as HTTP requests, from clients and serve the client's responses, such as HTTP responses, along with optional data content, such as web pages (e.g. HTML documents) and linked objects (such as images, video, documents, data, and so forth). The application server 236 can provide a user interface for users who do not communicate with the supply chain management computing system 200 using a web browser. Such users can have special software installed on their computing device to allow the user to communicate with the application server 236 via a network. Examples of example interfaces that are provided by the supply chain management computing system 200 are described in more detail below with regard to FIGS. 3-6.

Figure 3:
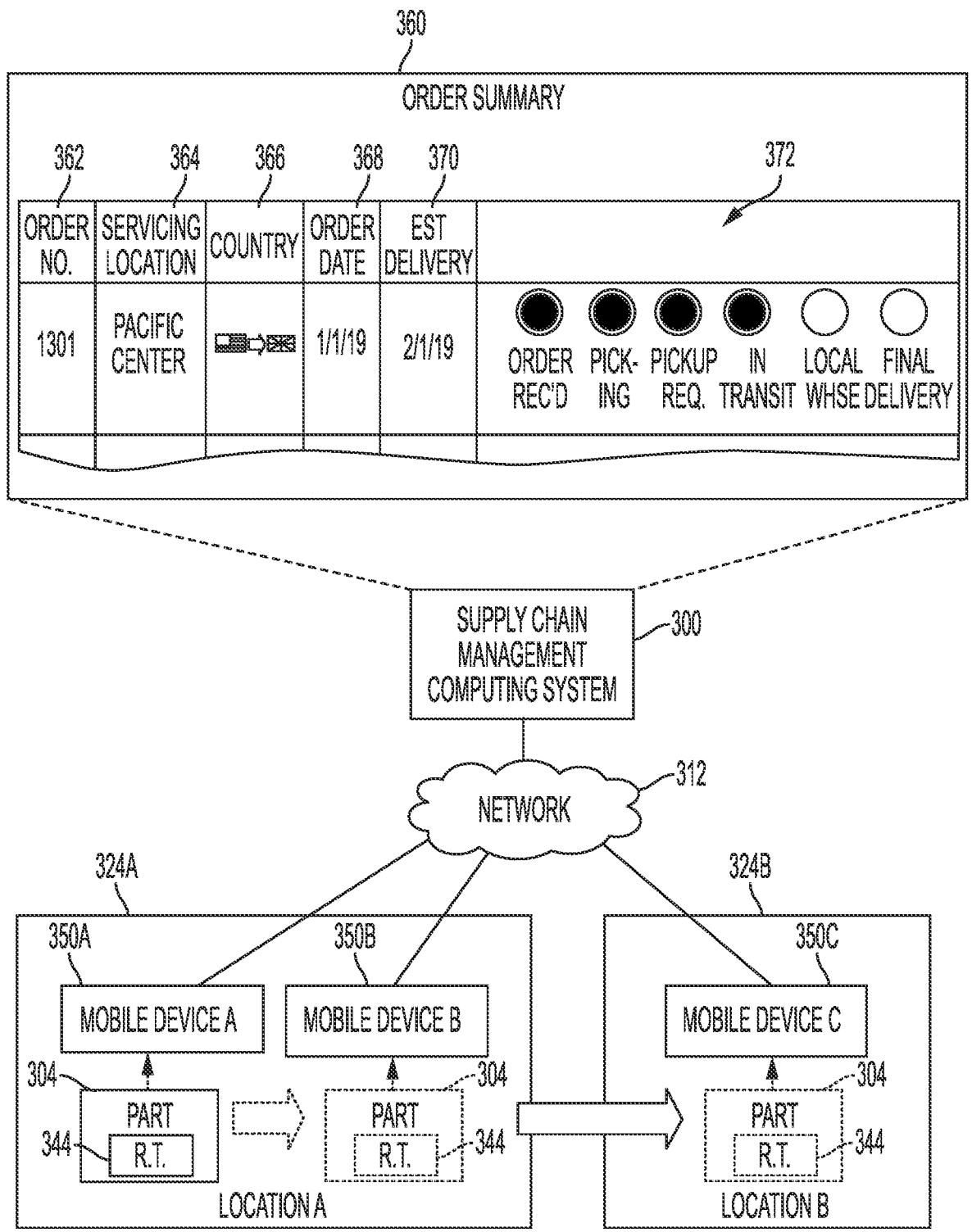
FIG. 3 schematically depicts an example order summary produced by an example supply chain management computing system.

Referring now to FIG. 3, an example order summary 360 produced by an example supply chain management computing system 300 in accordance with the present disclosure is schematically depicted. The order summary 360 can be presented on a suitable graphical display of a user's computing device. The order summary 360 can generally track the status of a particular order. The status can be tracked, for example, from receipt of the order though final delivery. The order summary 360 can have a variety of fields, such as an order number field 362, a servicing location 363, country information 366, order date information 368, and estimated delivery information 370.

The order summary 360 can also include an order progression status chart 372. Information in the order progression status chart 372 can be updated in substantially real-time based on various mobile devices 350A-C providing information to the supply chain management computing system 300. For example, mobile communications devices 350A and 350B can be associated with a first location 324A. When a part 304 is received a location 324A, a readable tag 344 can be initially scanned by the mobile communications device 350A. The mobile communications device 350A can provide this information to the supply chain management computing system 300 via a network 312 to inform the supply chain management computing system 300 that the part 304 has been received at location 324A. Immediately prior to departure from location 324A, the mobile communications device 350B can scan the readable tag 344 of the part 304 to inform the supply chain management computing system 300 that the part 304 is leaving the location 324A. Eventually, the part 304 will arrive at location 324B and be scanned in by the mobile communications device 350C. This mobile communications device 350C can provide the information to the supply chain management computing system 300 via the network 312 to inform the supply chain management computing system 300 that the part 304 has reached the location 324B. The supply chain management computing system 300 can update the order summary 360 accordingly, as well the inventory information associated with that location 324B.

Figure 4:
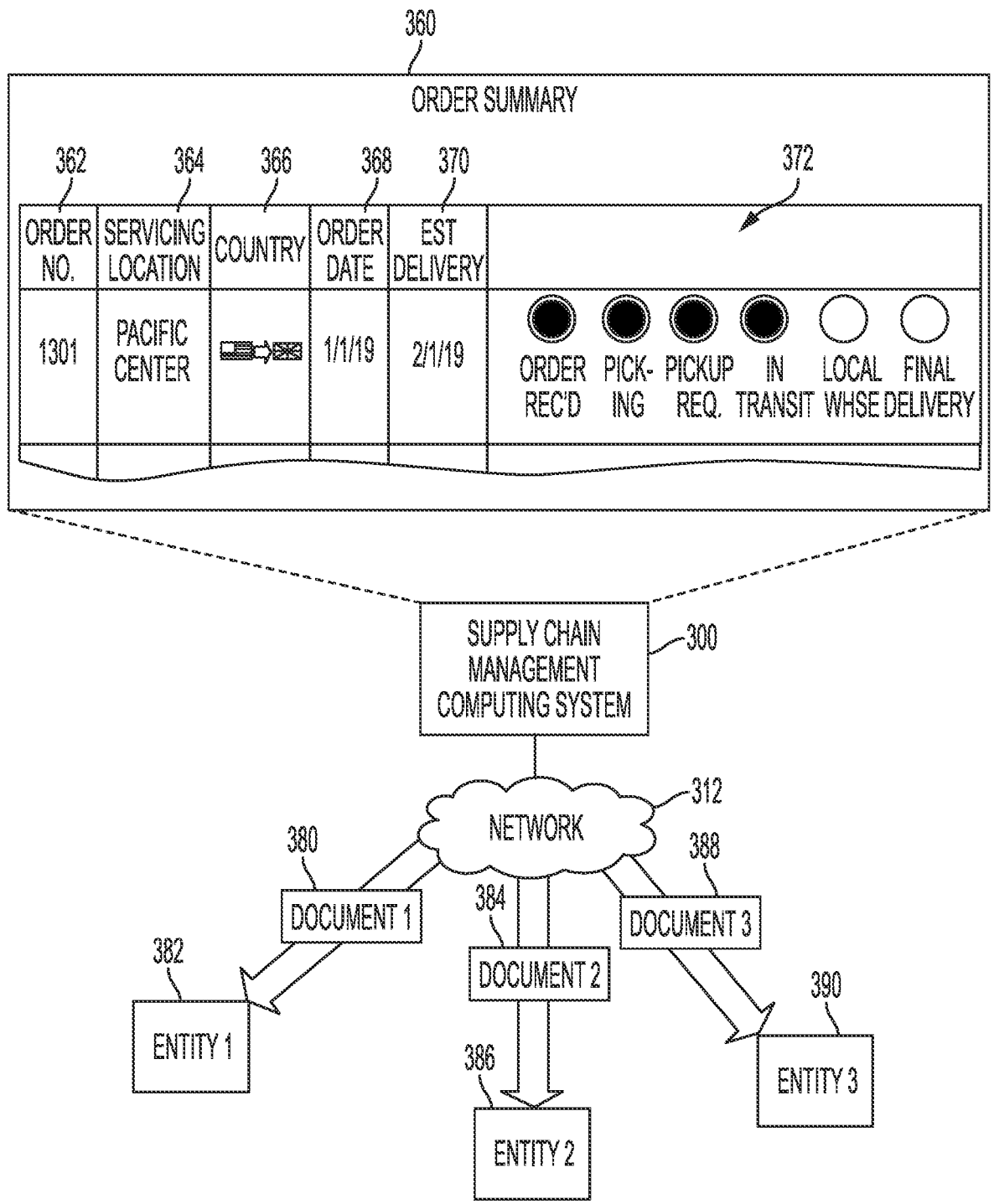
FIG. 4 schematically depicts the auto-generation of shipping forms by the supply chain management computing system.

The systems and methods described herein can facilitate and assist with the automation of international shipping processes. As is to be appreciated, international shipping processes can be quite complicated due in part to the documentation requirements. Further, countries each typically have different documentation requirements and a further complication, the requirements can change based on the type of products being shipped and the country of origin. As shown in FIG. 4, the supply chain management computing system 300 can auto-generate various forms, or otherwise automatically send documents, emails, tax forms, and the like to various entities to assist with the international shipping logistics. By way of example, the order schematically depicted in FIG. 4 is a shipment from the US to the UK. As an international shipment, the parts will necessarily go through customs, which requires certain paperwork for processing. The supply chain management computing system 300 can, for example, auto generate an email and send the email to the appropriate recipient in customs. A commercial invoice, along with other required shipping documents, tax documents, and so forth, can be attached to the email by the supply chain management computing system 300. Thus, the supply chain management computing system 300 can automate international shipping processes and ensure the proper information is being sent to the proper recipients. By way of example, FIG. 4 illustrates a document 380 being sent to entity 382, a document 384 being sent to entity 386, and a document 388 being sent to entity 390. Each document 380, 384, 380 may be any suitable document, such as an email message, a tax form, a commercial invoice, a certificate, an agreement, and so forth. In some embodiments, the supply chain management computing system 300 can assist in VAT processing, as the value of each product being sent into the country is known to the supply chain management computing system 300. Thus, in some cases, duties can be pre-paid and downloadable forms send by the supply chain management computing system 300 to the appropriate entity so the entity can file with the appropriate tax authority.

Figure 6:
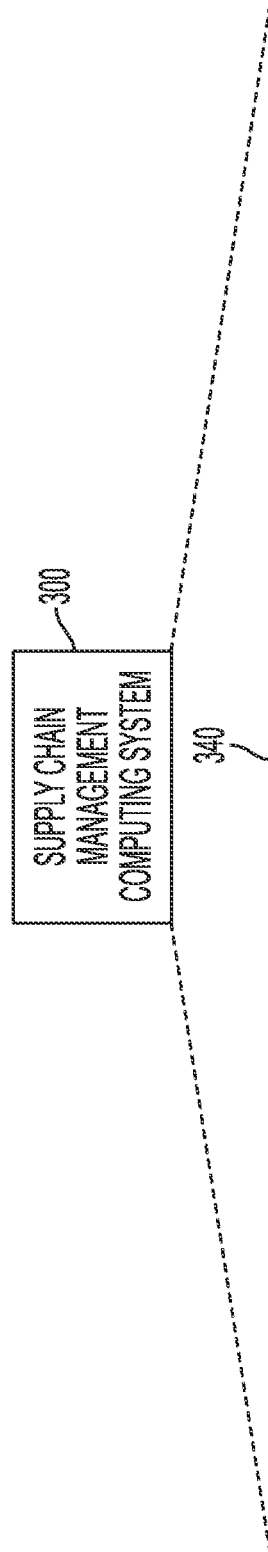
FIG. 6 schematically illustrates another interface that can be generated by the supply chain management computing system in accordance with one non-limiting embodiment.

FIG. 5 schematically illustrates an example order detail that can be generated by the supply chain management computing system 300 in accordance with one non-limiting embodiment. As is to be appreciated, the layout and content of an order detail can vary. Nevertheless, FIG. 5 depicts example aspects of an order that can be stored, tracked, and accessed by the supply chain management computing system 300. The order detail has a header 330 that identifies order information, such as current location, origin, destination, and so forth. A pallet details section 332 provides a readable tag associated with a pallet of the order. Size and weight of the pallet, as well as the dimensional weight of the pallet can be stored by the supply chain management computing system 300. An order overview section 334 provides a summary of all the parts of the order, and here, shows the parts that are on the pallet. A scanned items section 336 indicates that each item on the pallet is being tracked by the supply chain management computing system 300. The order detail also has an order progression status chart 338 that graphically indicates the process phase of the order. FIG. 6 schematically illustrates another interface that can be generated by the supply chain management computing system 300 in accordance with one non-limiting embodiment. As is to be appreciated, the layout and content of the interface can vary. Nevertheless, FIG. 6 depicts an example order summary screen 340 that can be generated by the supply chain management computing system 300. The order summary screen 340 can provide a high level overview of a plurality of different orders.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:
1. A computer-implemented method comprising:
   storing, by a supply chain management computing system, a parts catalog; said parts catalog includes a plurality of part profiles wherein one or more of said plurality of part profiles includes at least one additional downloadable file associated with said part; each of said plurality of part profiles includes a plurality of part details for a corresponding part of a plurality of parts tracked by said supply chain management computing system; each of said plurality of parts is associated with a unique readable tag; one or more of the plurality of part details includes one or more of a) customs-related information associated with said part and/or b) a value of said part;

providing, by said supply chain management computing system, an inventory interface; said inventory interface includes an inventory summary of said parts catalog; said inventory summary identifies each of a plurality of physical locations and identifies a real-time listing of parts at each of said plurality of physical locations;

providing, by said supply chain management computing system, a readable tag management interface; said readable tag management interface configured to associate said part profile of each of said plurality of parts with a unique readable tag;

providing, by said supply chain management computing system, an interface to each of a plurality of mobile communications devices; each of said plurality of mobile communications device includes a tag scanner;

receiving, by said supply chain management computing system, communications from each of said plurality of mobile communication devices; said communications includes information from unique readable tags scanned by said scanners of said respective mobile communications device;

updating, by said supply chain management computing system, said inventory interface based on said communications received from one or more of said plurality of mobile communications devices at a first physical location and communications subsequently received from one or more of said plurality of mobile communications devices at a second physical location;

providing, by said supply chain management computing system, an order progression status chart for an order of parts; said order of parts includes a subset of said plurality of parts tracked by said supply chain management computing system;

updating, by said supply chain management computing system, said order progression status chart in real-time based on said communications received from each of said plurality of mobile communications devices;

automatically generating, by said supply chain management computing system, one or more shipping forms for said order of parts; said one or more shipping forms includes one or more i) customs documentation for one or more parts of said order of parts, and/or ii) tax documentation to be filed with a tax authority; said shipping forms are pre-populated based in part on one or more of I) said order progression, II) a physical location of said order of parts, III) tax obligations associated with said order of parts and/or IV) a value of said order of parts;

processing, by said supply chain management computing system, pre-payment of duties and taxes associated with said order of parts based on said value of said order of parts and said tax obligations;

automatically generating, by said supply chain management computing system, downloadable forms for entities to file with tax authorities, said forms including pre-paid duty and tax information;

facilitating, by said supply chain management computing system, Value-Added Tax (VAT) processing for said order of parts, wherein the supply chain management computing system calculates VAT amounts based on said value of said order of parts and pre-pays said VAT amounts to the appropriate tax authorities;

automatically generating, by said supply chain management computing system, VAT documentation for said order of parts, said VAT documentation including pre-paid VAT amounts and necessary information for compliance with tax regulations;

transmitting, by said supply chain management computing system, said shipping forms, VAT documentation, and said downloadable forms to a customs agency and/or said tax authority, and providing said VAT documentation to entities involved in said order of parts;

automating, by said supply chain management computing system, international e-commerce transactions for said order of parts by integrating said pre-payment of duties, taxes, and VAT processing into the order fulfillment process; and transmitting, by said supply chain management computing system, said shipping forms to a customs agency and/or said tax authority.

2. The computer-implemented method as defined in claim 1, wherein said at least one additional downloadable file includes one or more of a) assembly instructions and/or b) an image of said part.

3. The computer-implemented method as defined in claim 1, wherein said shipping forms includes both said customs documentation and said tax documentation.

4. The computer-implemented method as defined in claim 2, wherein said shipping forms includes both said customs documentation and said tax documentation.

5. The computer-implemented method as defined in claim 1, further comprising generating, by said supply chain management computing system, said unique readable tag; said unique readable tag includes one or more of a barcode and/or a quick response code.

6. The computer-implemented method as defined in claim 4, further comprising generating, by said supply chain management computing system, said unique readable tag; said unique readable tag includes one or more of a barcode and/or a quick response code.

7. The computer-implemented method as defined in claim 1, wherein each of said plurality of part profiles comprises current location information and last action information.

8. The computer-implemented method as defined in claim 6, wherein each of said plurality of part profiles comprises current location information and last action information.

9. The computer-implemented method as define in claim 1, wherein said updating of said order progression status chart in real-time based on said communications received from one or more of said plurality of mobile communications devices includes continually updating said order progression from receipt of said order through final delivery.

10. The computer-implemented method as define in claim 8, wherein said updating of said order progression status chart in real-time based on said communications received from one or more of said plurality of mobile communications devices includes continually updating said order progression from receipt of said order through final delivery.

11. A computer-implemented method comprising:
storing, by a supply chain management computing system, a plurality of part profiles; each of said plurality of part profiles includes a plurality of part details for a corresponding part of a plurality of parts tracked by said supply chain management computing system; said plurality of part profiles includes one or more of a) customs-related information associated with said part and/or b) a value of said part; a unique readable tag is affixed to each of said plurality of parts;

providing, by said supply chain management computing system, an inventory interface; said inventory interface is configured to identify each of a plurality of physical locations and identify a real-time listing of parts at each of said plurality of physical locations;

providing, by said supply chain management computing system, a readable tag management interface; said readable tag management interface configured to associate said part profile of each of said plurality of parts with said unique readable tag;

providing, by said supply chain management computing system, an interface to each of a plurality of mobile communications devices; each of said plurality of mobile communications devices includes a tag scanner;

receiving, by said supply chain management computing system, communications from each of said plurality of mobile communication devices; said communications includes information from unique readable tags scanned by said scanners of said respective mobile communications device;

updating, by said supply chain management computing system, said inventory interface based on said communications received from one or more of said plurality of mobile communications devices and communications subsequently received from one or more of said plurality of mobile communications devices at a second physical location;

providing, by said supply chain management computing system, an order progression status chart for an order of parts; said order of parts includes a subset of said plurality of parts tracked by said supply chain management computing system;

updating, by said supply chain management computing system, said order progression status chart based on the communications received from one or more of said plurality of mobile communication devices;

automatically generating, by said supply chain management computing system, a first customs form associated with a first physical location; said first customs form is pre-populated based in part on one or more of a) said order progression, b) said customs-related information, c) a value of said part, and/or d) said first physical location;

transmitting, by said supply chain management computing system, said first customs form a customs agency and/or a tax authority;

automatically generating, by said supply chain management computing system, a second customs form associated with said second physical location; said second customs form is pre-populated based in part on one or more of a) said order progression, b) said customs-related information, c) a value of said part, and/or d) second physical location;

processing, by said supply chain management computing system, pre-payment of duties and taxes associated with said order of parts based on said value of said parts and tax obligations;

automatically generating, by said supply chain management computing system, downloadable forms for entities to file with tax authorities, including pre-paid duty and tax information;

facilitating Value-Added Tax (VAT) processing for said order of parts by calculating and pre-paying VAT amounts to appropriate tax authorities and generating VAT compliance documentation;

automating international e-commerce transactions by integrating pre-payment of duties, taxes, and VAT processing into the order fulfillment process; and transmitting, by said supply chain management computing system, said second customs form to said customs agency and/or said tax authority.

12. The computer-implemented method as defined in claim 10, wherein one or more of said plurality of part profiles includes at least one downloadable file associated with said part wherein the at least one downloadable file includes an image of the part and/or assembly instructions.

13. The computer-implemented method as defined in claim 10, further comprising printing, by said supply chain management computing system, said unique readable tag; said unique readable tag includes one or more of a barcode and/or a quick response code.

14. The computer-implemented method as defined in claim 12, further comprising printing, by said supply chain management computing system, said unique readable tag; said unique readable tag includes one or more of a barcode and/or a quick response code.

15. A supply chain management computing system comprising one or more computer processors and computer-readable medium having computer-executable instructions stored thereon; said computer-executable instructions instruct said one or more computer processors to perform the following operations:

store a parts catalog; said parts catalog includes a plurality of part profiles; each of said plurality of part profiles includes a plurality of part details for a corresponding part of a plurality of parts tracked by said supply chain management computing system; said plurality of part details includes a) customs-related information associated with said part and/or b) a value of said part; each of said plurality of parts is associated with a unique readable tag;

provide an inventory interface; said inventory interface includes an inventory summary of said parts catalog; said inventory summary configured to identify each of a plurality of physical locations and identify a listing of parts at each of said plurality of physical locations;

provide a readable tag management interface associating said part profile of each of said plurality of parts with said unique readable tag;

provide an interface to each of a plurality of mobile communications devices; each of said plurality of mobile communications devices includes a tag scanner;

receive communications from each of said plurality of mobile communication devices; said communications include information from unique readable tags scanned by said scanners of said respective mobile communications device;

update said inventory interface based on said communications received from one or more of said plurality of mobile communications devices at a first physical location and communications subsequently received from one or more of said plurality of mobile communications devices at a second physical location;

provide an order progression status chart for an order of parts; said order of parts includes a subset of the plurality of parts tracked by said supply chain management computing system;

update said order progression status chart based on the communications received from one or more of said mobile communications devices;

automatically generating one or more shipping forms for said order of parts; said one or more shipping forms includes one or more i) customs documentation for one or more parts of said order of parts, and/or ii) tax documentation to be filed with a tax authority; said shipping forms are pre-populated based in part on one or more of I) said order progression, II) a physical location of said order of parts and/or III) a value of said order of parts;

process pre-payment of duties and taxes associated with the order of parts based on the value of the order and tax obligations;

automatically generate downloadable forms for entities to file with tax authorities, including pre-paid duty and tax information;

facilitate Value-Added Tax (VAT) processing by calculating VAT amounts, pre-paying VAT to tax authorities, and generating VAT documentation necessary for compliance;

automate international e-commerce transactions by integrating pre-payment of duties, taxes, and VAT processing into the order fulfillment process;

generate said unique readable tag, wherein said unique readable tag includes one or more of a barcode and/or a quick response code; and transmit said shipping forms to a customs agency and/or said tax authority.

16. The supply chain management computing system as defined in claim 14, wherein one or more of said plurality of part profiles includes at least one downloadable file associated with said part; said downloadable file includes one or more of assembly instructions, image of said part, and/or customs documentation.

17. The supply chain management computing system as defined in claim 14, wherein said computer-executable instructions further instruct said one or more computer processors to generate said unique readable tag; said unique readable tag includes one or more of a barcode and/or a quick response code.

18. The supply chain management computing system as defined in claim 14, wherein each of said plurality of part profiles includes current location information and last action information.

19. The supply chain management computing system as defined in claim 17, wherein each of said plurality of part profiles includes current location information and last action information.

20. The supply chain management computing system as defined in claim 14, wherein updating said order progression status chart based on said communications received from one or more of said plurality of mobile communications devices includes continually updating said order progression status chart from receipt of said order through final delivery.

21. The supply chain management computing system as defined in claim 18, wherein updating said order progression status chart based on said communications received from one or more of said plurality of mobile communications devices includes continually updating said order progression status chart from receipt of said order through final delivery.

\* \* \* \* \*